(12) United States Patent
Tsai et al.

(10) Patent No.: US 7,670,017 B2
(45) Date of Patent: Mar. 2, 2010

(54) LUMINOUS KEY MECHANISM

(75) Inventors: Wen-Yu Tsai, Changhua County (TW); Wen-Kuang Hou, Miaoli County (TW); Yung-Nien Chai, Tainan (TW)

(73) Assignee: Darfon Electronics Corp., Taoyuan (TW)

( * ) Notice: Subject to any disclaimer, the term of this patent is extended or adjusted under 35 U.S.C. 154(b) by 251 days.

(21) Appl. No.: 11/854,491

(22) Filed: Sep. 12, 2007

(65) Prior Publication Data
US 2008/0062671 A1    Mar. 13, 2008

(30) Foreign Application Priority Data
Sep. 13, 2006    (TW) ............................... 95216311 U

(51) Int. Cl.
*F21V 33/00*    (2006.01)

(52) U.S. Cl. .............................. 362/23; 362/24; 362/85; 200/310

(58) Field of Classification Search .................. 362/30, 362/24, 23, 85, 253, 800; 200/310, 314, 200/317
See application file for complete search history.

(56) References Cited

U.S. PATENT DOCUMENTS
4,874,913 A * 10/1989 Aoki et al. .................. 200/314

* cited by examiner

*Primary Examiner*—Bao Q Truong
(74) *Attorney, Agent, or Firm*—Quintero Law Office

(57) ABSTRACT

A luminous key mechanism. A keycap moves with respect to a base plate and includes a transparent window. A light-emitting element is disposed under the keycap. A condenser is connected to the transparent window and opposes the light-emitting element. Light output from the light-emitting element is condensed by the condenser and output via the transparent window.

3 Claims, 1 Drawing Sheet

LUMINOUS KEY MECHANISM

BACKGROUND OF THE INVENTION

1. Field of the Invention

The invention relates to a luminous key mechanism, and in particular to a luminous key mechanism providing light-condensing effect.

2. Description of the Related Art

Generally, a light-emitting element (such as an LED) is disposed under specific keys (such as Caps Lock and Num Lock keys) in a conventional keyboard or luminous keyboard, providing light-pervious and recognition functions. Namely, light output from the light-emitting element passes through transparent windows formed on keycaps of the specific keys, enabling the specific keys to be easily recognized.

As light output from a common light-emitting element often scatters, the intensity of the light passing through the transparent windows of the keycaps is reduced. To increase the intensity of the light passing through the transparent windows of the keycaps, a high-powered light-emitting element (such as a high-brightness LED) can replace the common light-emitting element. Better light-pervious effect is thus provided to the keycaps.

Utilization of the high-powered light-emitting element, however, has many drawbacks. The high-powered light-emitting element is expensive and requires high power consumption. Additionally, light scatter provided by the high-powered light-emitting element is relatively high. Namely, the light output from the high-powered light-emitting element easily scatters to other keys disposed near the specific keys. An extra shielding mechanism is thus required in the specific keys, preventing the light output from the high-powered light-emitting element from scattering to the other keys. Accordingly, complexity of assembly and manufacturing costs of the keyboard or luminous keyboard are increased.

Hence, there is a need for a luminous key mechanism with enhanced light-pervious effect for a transparent window of a keycap, reduced manufacturing costs, and simplified assembly.

BRIEF SUMMARY OF THE INVENTION

A detailed description is given in the following embodiments with reference to the accompanying drawings.

An exemplary embodiment of the invention provides a luminous key mechanism comprising a base plate, a keycap, a light-emitting element, and a condenser. The keycap moves with respect to the base plate and comprises a transparent window. The light-emitting element is disposed under the keycap. The condenser is connected to the transparent window and opposes the light-emitting element. Light output from the light-emitting element is condensed by the condenser and output via the transparent window.

The condenser comprises a convex lens.

The condenser is disposed under the keycap and integrally formed therewith.

The condenser is disposed under the keycap and attached thereto.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
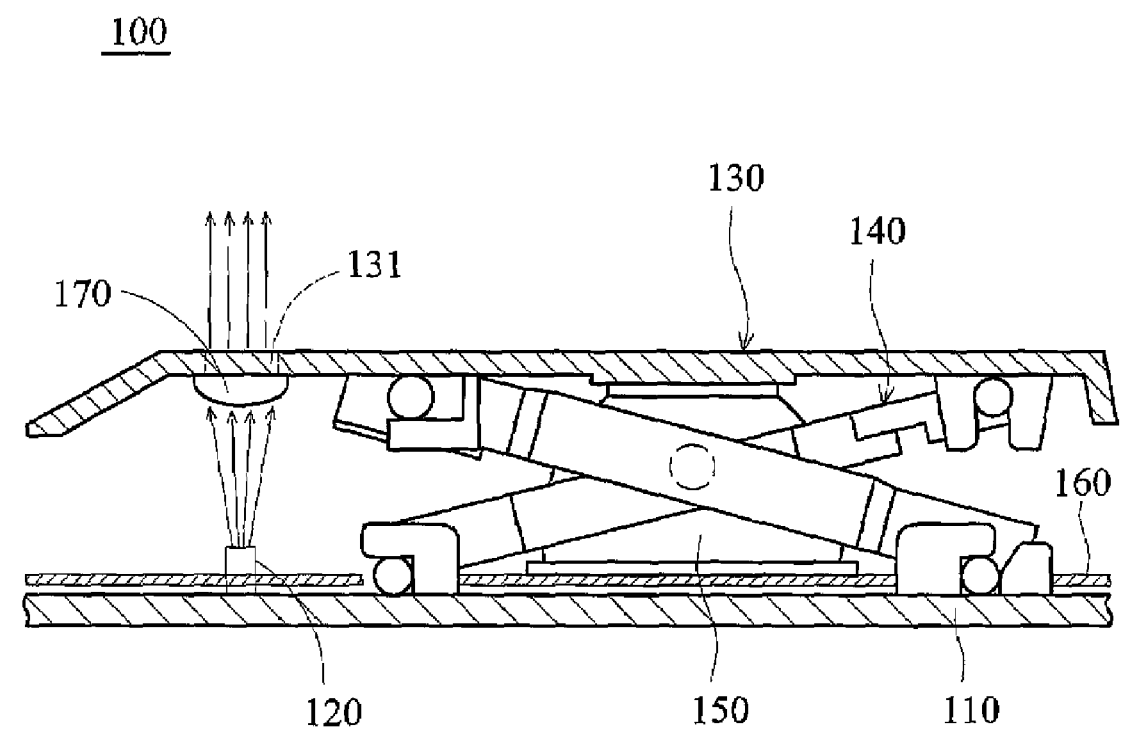
FIG. 1 is a schematic cross section of a luminous key mechanism of an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

Referring to FIG. 1, a luminous key mechanism 100 can serve as a specific key (such as a Caps Lock or Num Lock key) of a luminous keyboard and comprises a base plate 110, a light-emitting element 120, a keycap 130, a scissors linking assembly 140, a resilient member 150, a membrane circuit assembly 160, and a condenser 170.

The light-emitting element 120 is disposed under the keycap 130. Specifically, the light-emitting element 120 may be disposed on the membrane circuit assembly 160 or base plate 110. In this embodiment, the light-emitting element 120 may be an LED.

The keycap 130 moves upward and downward with respect to the base plate 110 and comprises a transparent window 131. In this embodiment, the keycap 130 is movably disposed on the base plate 110 by the scissors linking assembly 140 and resilient member 150. Specifically, the membrane circuit assembly 160 is disposed on the base plate 110, the scissors linking assembly 140 is connected between the base plate 110 and the keycap 130, and the resilient member 150 is connected between the membrane circuit assembly 160 and the keycap 130. Accordingly, the keycap 130 can move upward and downward with respect to the base plate 110 by the scissors linking assembly 140 and resilient member 150.

The condenser 170 is disposed under the keycap 130. Specifically, the condenser 170 is connected to the transparent window 131 of the keycap 130 and opposes the light-emitting element 120. In this embodiment, the condenser 170 may be a convex lens, providing light-condensing effect. Moreover, the condenser 170 may be attached to the transparent window 131 of the keycap 130 or integrally formed with the keycap 130.

Accordingly, light output from the light-emitting element 120 is first condensed by the condenser 170 and then output via the transparent window 131 of the keycap 130.

Accordingly, first condensed by the condenser 170, the light output from the light-emitting element 120 does not overly scatter. Thus, a common (or low-powered) LED can be used as the light-emitting element 120, ensuring or enhancing the intensity of the light output via the transparent window 131. The embodiment of the invention achieves superior light-pervious and recognition effects of the keycap 130, while reducing manufacturing costs and power consumption of the luminous key mechanism 100. Additionally, in the luminous key mechanism 100, an extra shielding mechanism is omitted, such that assembly is simplified and manufacturing costs are further reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A luminous key mechanism, comprising:

a base plate;

a keycap moving with respect to the base plate and comprising a transparent window;

a light-emitting element disposed under the keycap; and a condenser connected to the transparent window and opposing the light-emitting element, wherein the condenser comprises a convex lens, and light output from the light-emitting element is condensed by the convex lens and output via the transparent window.

2. The luminous key mechanism as claimed in claim 1, wherein the condenser is disposed under the keycap and integrally formed therewith.

3. The luminous key mechanism as claimed in claim 1, wherein the condenser is disposed under the keycap and attached thereto.

\* \* \* \* \*